Oct. 3, 1950 W. H. BLISS 2,524,691

PULSE RECEIVER

Filed July 27, 1945

INVENTOR
WARREN H. BLISS.
BY H. G. Grover
ATTORNEY

Patented Oct. 3, 1950

2,524,691

UNITED STATES PATENT OFFICE 2,524,691

PULSE RECEIVER

Warren H. Bliss, Riverhead, N. Y., assignor to Radio Corporation of America, a corporation of Delaware Application July 27, 1945, Serial No. 607,435

5 Claims. (Cl. 250—20)

The present invention relates to a gating system for effectively coupling a receiver to a source of signals at controllable repetitive periods of time. The invention is particularly useful in connection with radio receivers adapted to receive signals of a pulse type and in which it is desirable to make the receiver non-responsive during the intervals between received signal pulses.

When two or more pulse transmitters and receivers operate in the same vicinity and on the same frequency, it is often desirable to assure the reception of signals on only that receiver for which the signals are intended, and to eliminate all other signals. Such an arrangement reduces noise and undesirable interference in the reception of signals. In pulse systems, it may also be desirable to make the receiver non-operative or non-responsive during the intervals when the transmitter is "on" in order to prevent blocking of the receiver by strong local signals.

One of the objects of the present invention is to effectively couple a receiver to a source of incoming signals for periods of controllable time duration and which start a controllable time after locally produced pulses.

Figure 1:
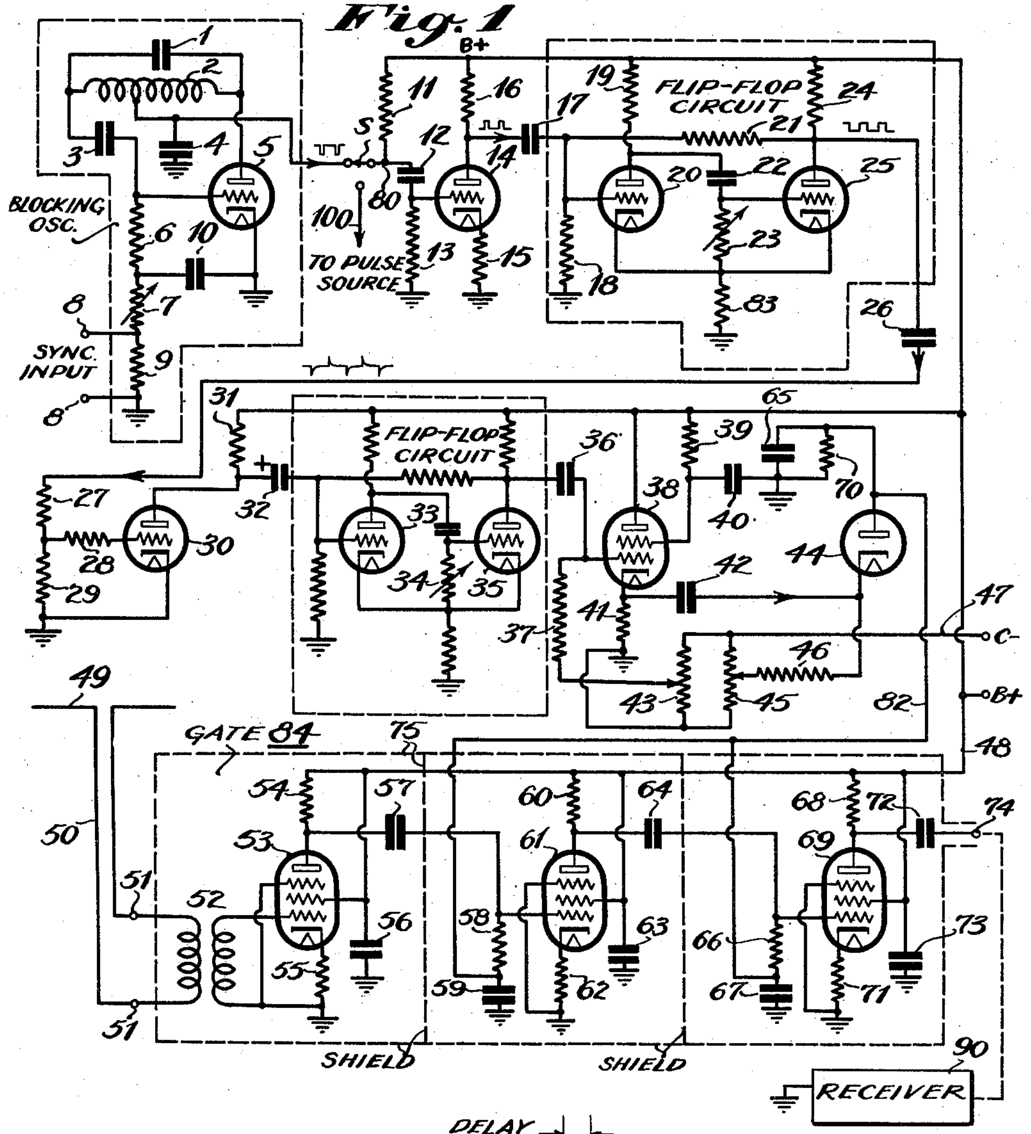
Figure 2:
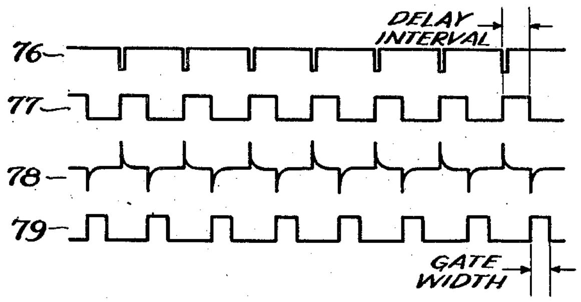

The following is a more detailed description of the invention accompanied by drawings, wherein:

Fig. 1 is a circuit diagram illustrating a specific embodiment of the invention, and Fig. 2 is a series of curves graphically illustrating the voltage wave forms or variations at different points in the system of Fig. 1.

Referring to Fig. 1 in more detail, there is shown a blocking oscillator of the Hartley type, including a triode vacuum tube 5 having in circuit therewith an oscillatory or tank circuit comprising the parallel combination of a coil 2 and a condenser 1. Triode 5 is provided with a grid condenser 3 and grid resistor circuit composed of resistors 6, 7 and 9 in series. Resistor 7 is variable and resistor 9 is provided with terminals 8 for injection of synchronizing voltage. By-pass condensers 4 and 10 are used to by-pass to ground the high radio frequencies, and a resistor 11 is provided in series in the connection between the plate of tube 5 and the lead 48 supplying positive potential from a source of anode polarizing potential B+.

Triode vacuum tube 14 is a coupling or buffer element operating as a class A amplifier and having a plate resistor 16, a grid resistor 13 and a cathode resistor 15. There is a condenser 12 in the grid or input circuit and a condenser 17 in the anode or output circuit of the tube 14.

Triode vacuum tubes 20 and 25 comprise a flip-flop or trigger circuit having one degree of electrical stability. Tubes 20 and 25 are interconnected regeneratively and have anode resistors 19 and 24, a common cathode resistor 83, an inter-coupling resistor 21 and an inter-coupling condenser 22. Tube 20 has a fixed grid resistor 18 and tube 25 has a variable grid resistor 23. These tubes 20 and 25 act as a variable delay device as will be explained later. In the stable state of the flip-flop circuit, tube 20 is non-conductive and tube 25 is conductive. In the active state, the current passing conditions of these tubes are reversed.

Condenser 26 feeds the output of this delay device 20, 25 to a second buffer amplifier vacuum tube 30 having an input potential divider composed of resistors 27 and 29, and a current limiting grid input resistor 28. The cathode of tube 30 is connected directly to ground so that the tube has no fixed negative grid bias. Hence, tube 30 is normally conductive. An anode resistor 31 and output condenser 32 are provided as shown.

Triode vacuum tubes 33 and 35 comprise a second flip-flop or trigger circuit having one degree of electrical stability. This trigger circuit develops the gating signal with a variable resistor 34 for adjusting the gate length (i. e., controlling the width of the gate). These tubes 33 and 35 have other associated elements in the same manner as tubes 20 and 25. In the stable state of this second flip-flop circuit, tube 33 is non-conductive and tube 35 conductive. In the active state, tube 33 is conductive and tube 35 non-conductive.

The anode of tube 35 is coupled to the control grid of tetrode vacuum tube 38 by means of condenser 36. This tetrode has a screen resistor 39, a screen by-pass condenser 40, and a cathode output resistor 41. The anode of tube 38 is connected directly to the B+ plate supply lead 48. A control grid resistor 37 has its lower end connected to the sliding tap or contact on negative bias potentiometer 43.

The cathode of tetrode tube 38 is coupled to the cathode of diode vacuum tube 44 by way of condenser 42. The cathode of diode 44 is also connected through series resistor 46 to a second biasing potentiometer 45, as shown. Potentiometers 43 and 45 are connected to the lead 47 extending to the negative terminal of a source of unidirectional potential C—. The output of diode 44 (taken from its anode) is fed by lead 82 to the gate 84 composed of pentode vacuum tubes 53, 61 and 69 and associated circuit elements within a rectangular box shown in dash lines.

The gate 84 is essentially an amplifier type of circuit but its anode resistors 54, 60 and 68 and its grid resistors 58 and 66 are of such low values that the overall gain is approximately zero. For purposes of illustration, an antenna 49 with a feed-in line 50 is shown connected to the input terminals 51. An input transformer 52 feeds the incoming radio signal collected by antenna 49 to the control grid of the first pentode 53. Most of this circuit 84 is that of a conventional resistance-capacity coupled three-stage pentode class A amplifier. The screen grids of these pentodes are connected directly to the B+ supply by way of lead 48 and are by-passed to ground by condensers 56, 63 and 73. These last condensers serve to by-pass only the radio frequencies picked up on antenna 49. Cathode resistors 55, 62 and 71 are provided for the pentode tubes 53, 61 and 69, respectively.

The lower ends of grid resistors 58 and 66 are by-passed to ground by condensers 59 and 67, respectively, and are connected directly to lead 82 extending from the anode of diode 44. This connection 82 provides control bias from the diode 44 for operating the gate. A resistor 70 and a shunt-connected by-pass condenser 65 are associated with the output of diode 44.

For optimum operation, a metallic shield 75 (shown by the dash lines) is used to shield the three parts of the gate circuit from each other and from external signal pick up. This shield 75 prevents leakage of the signal through the gate 84 which may occur because of capacity couplings. A shielded output lead 74 is likewise used for coupling the output of the gate 84, taken through condenser 72, to the radio receiver 90 shown in box form, with which the invention is to be used.

The operation of the invention will now be described:

Triode 5 operates in an intermittent or blocking fashion because of the comparatively large value of grid resistors 6 and 7. Wave form 76 (Fig. 2) shows the potential variation at point 80 which is used as the output of tube 5. This output consists of a series of negative pulses whose frequency is adjustable by means of variable resistance 7, and which is applied to the grid of buffer 14 via condenser 12. An alternating current wave of suitable frequency may be introduced at terminals 8 for purposes of synchronizing the gate.

Triode vacuum tube 14 acts as a buffer and phase inverter which amplifies and reverses the polarity of the pulses of graph 76. The pulses derived from the plate of tube 14 are positive in polarity and are applied to the grid of trigger tube 20 via condenser 17. Tubes 20 and 25 operate as a flip-flop circuit with tube 25 being normally conductive and tube 20 being normally non-conductive in the stable state. Each pulse from triode 14 triggers or fires the flip-flop circuit from its stable state to the active state in which tube 20 becomes conductive for a short interval of time and tube 25 becomes non-conductive because of the regenerative coupling between the two tubes. The duration of the active state of the flip-flop circuit, corresponding to the conduction period of tube 20, is controlled by variable resistor 23, and the duration of the conduction period can be set at any desired value depending on how long it is desired to delay the gate behind its synchronizing voltage. After a desired interval of time in the active state, the flip-flop circuit restores itself to the stable state. Graph 77 of Fig. 2 illustrates a typical operation and is the voltage wave form appearing in the anode of tube 25.

The output of this variable delay flip-flop circuit 20, 25 is differentiated by condenser 26 and appears on lead 81 as shown by graph 78 of Fig. 2. Triode 30 receives these sharp pulses of graph 78 and acts as a limiter in that it clips the positive peaks. It also inverts the negative peaks applied to its grid into positive pulses available at its anode for triggering tube 33.

Triodes 33 and 35 comprise a second flip-flop or self restoring trigger circuit regeneratively coupled, and they operate in the same manner as tubes 20 and 25. The output of tube 35, as shown by graph 79 of Fig. 2, is fed to the control grid of tetrode 38. It should be noted that tube 33 is triggered at the same instant that tube 20 ceases conduction, and also that the duration of the period of the active state of flip-flop circuit 33, 35, corresponding to the conduction of tube 33, is controlled by variable resistor 34. Wave form 79 may be considered as the gate voltage. The adjustment of resistor 34 regulates the gate length. The time constants of the flip-flop circuit 33, 35 are different from those of flip-flop circuit 20, 25. The output from flip-flop circuit 33, 35 occurs at a desired interval of time later than the output from the blocking oscillator; or, putting it in other words, circuit 20, 25 acts to delay the controlling voltage for the gate 84 by a certain adjustable time interval relative to the pulses applied to circuit 20, 25.

Tetrode 38 and one way current passing valve diode 44 with associated elements act to reduce the average high positive potential of the gate voltage received from tube 35 to a negative value for application to the gate unit 84.

Tetrode 38 is normally non-conductive and receives the positive potential output of tube 35 (graph 79 of Fig. 2) and passes this positive potential on through condenser 42 to the cathode of diode 44. This tube 38 is a cathode follower biased to or beyond cut-off except when a gating pulse is being applied thereto from tube 35. Potentiometer 43 supplies control grid bias for tetrode 38. Potentiometer 45 supplies high negative bias through diode 44 to lead 82 for the purpose of causing complete signal cut-off in gate unit 84. This condition occurs because tube 44 is normally conductive due to the negative bias supplied to its cathode. When a positive gating pulse from the cathode of tube 38 is applied to diode 44, this diode is biased to non-conduction and lead 82 suddenly rises to zero or ground potential for the duration of the gate pulse.

The incoming signal to be gated is collected by receiving antenna 49, thence carried over leads 50 and fed into gate 84 by way of terminals 51 and transformer 52. This signal is applied to the control grid of normally conductive pentode amplifier 53 and passes through the three stages 53, 61 and 69 of gate 84 only during the intervals when the gate is "open." The gate is "open" only when the potential on lead 82 obtained from diode 44 is raised, which occurs when diode 44 is made non-conductive by the application of positive pulses to its cathode from tetrode 38. Between such "open" intervals, pentodes 61 and 69 are biased far beyond cut-off by the negative potential on lead 82 so as to prevent the transmission of signals through the gate. The gating or control pulses from diode 44 "open" the gate 84 momentarily by removing this cut-off bias. Thus, the incoming signals are allowed to pass through the gate 84 to lead 74 and receiver 90 only during those intervals when the gate is "open."

For some types of operation, it may be desirable to use a direct trigger voltage to operate the gate at certain isolated or irregularly occurring times. In this case, the blocking oscillator may be removed or effectively disconnected from the rest of the system by connecting switch S to lead 100 which supplies the triggering pulses directly to point 80 feeding the grid of triode 14.

It should be evident that the present invention enables the gate to be controlled (opened) at some controllable finite time after the application of a pulse to the first flip-flop or trigger circuit. Both the start of the control pulse for the gate 84 and the duration of this gate control pulse are controllable by the operator, primarily by adjustments of the time constants of the two flip-flop circuits 20, 25 and 33, 35.

Among the features of the invention are: (1) The gate can be synchronized from any desired alternating current wave whose frequency or repetition rate is the same as the desired gate frequency or an integral multiple thereof. (2) The phase of the gate with respect to the synchronizing wave is adjustable over a wide range. (3) The length of the gate is adjustable over a wide range. (4) The gate can be triggered by pulses which occur at random, and under such operation the opening of the gate can be delayed behind the triggering pulse by an adjustable amount. (5) The gate provides an exceedingly high amount of attenuation to incoming signals during its "closed" position.

What is claimed is:

1. In a radio receiving system for receiving signal pulses of radio frequency energy, a receiver, an antenna for receiving signal pulses, a cascade connected multi-stage electron discharge device circuit coupling said antenna to said receiver, a source of locally produced recurring waves, a coupling circuit between said antenna and the first stage of said discharge device circuit, said first stage being an amplifier which is biased to pass current, the subsequent stages being biased to cut-off in the absence of recurring waves applied thereto by said source, and means coupled between said source and said subsequent stages of said discharge device circuit for overcoming the cut-off bias of said last stages independently of the output level of said receiver and at the repetition rate of said recurring waves and for finite periods of time which are delayed in time with respect to said recurring waves, said means including a one way current passing valve through which said subsequent stages receive a negative bias for causing them to be non-conductive, and a trigger circuit under control of said source for biasing said one way valve to cut-off at a recurring rate and for a time duration depending in part upon the time constants of the trigger circuit, to thereby change the bias on said subsequent stages and permit them to conduct during the non-conduction periods of said one-way valve.

2. In combination, first and second electron tube trigger circuits each having a stable state and an active or unstable state, adjustable elements in said trigger circuits for controlling the time durations of the active state, a connection for supplying an input pulse to said first circuit for changing it from the stable to the active state to thereby produce an output pulse of rectangular wave form, means including a differentiator coupling the output of said first circuit and the input of said second circuit, said means functioning to produce sharp pulses from the relatively steep wave fronts of the rectangular wave form pulse produced by said first trigger circuit, a cathode follower tube coupled to the output of said second trigger circuit for obtaining therefrom a positive pulse, a diode having its cathode connected to said cathode follower and its anode connected to ground, a source of unidirectional potential for supplying a negative bias to said diode cathode to render said diode conductive in the absence of a pulse from said cathode follower tube, said diode becoming non-conductive upon receipt of a pulse of positive polarity from said cathode follower tube, a vacuum tube having a grid, a connection from said grid to the anode of said diode, whereby said vacuum tube is biased to cut-off during the conduction condition of said diode and receives a pulse from said diode when the current passing condition of said diode changes, said pulse being of such polarity and magnitude as to cause said vacuum tube to conduct.

3. In combination, first and second electron tube trigger circuits each having a stable state and an active or unstable state, adjustable elements in said trigger circuits for controlling the time durations of the active state, a connection for supplying an input pulse to said first circuit for changing it from the stable to the active state to thereby produce an output pulse of rectangular wave form, means including a differentiator coupling the output of said first circuit and the input of said second circuit, said means functioning to produce sharp pulses from the relatively steep wave fronts of the rectangular wave form pulse produced by said first trigger circuit, a cathode follower tube coupled to the output of said second trigger circuit for obtaining therefrom a positive pulse, a vacuum tube coupled to said cathode follower and biased to conduct in the absence of a pulse from said cathode follower tube and adapted to become cut-off by the passage of a pulse through said cathode follower, and a discharge device circuit coupled to said vacuum tube and biased to cut-off by the flow of current through said vacuum tube, said discharge device circuit deriving from said vacuum tube a pulse when the current passing condition of said vacuum tube changes, said pulse being of such polarity and magnitude as to cause said discharge device to conduct.

4. In combination, first and second electron tube trigger circuits each having a stable state and an active or unstable state, adjustable elements in said trigger circuits for controlling the time durations of the active state, a connection for supplying an input pulse to said first circuit for changing it from the stable to the active state to thereby produce an output pulse of rectangular wave form, means including a differentiator coupling the output of said first circuit and the input of said second circuit, said means functioning to produce sharp pulses from the relatively steep wave fronts of the rectangular wave form pulse produced by said first trigger circuit, a multi-grid cathode follower vacuum tube having its control grid coupled to the output of said second trigger circuit for obtaining therefrom a positive pulse, means including a potentiometer having a source of voltage connected thereto for supplying said control grid with bias voltage of such polarity and magnitude as to bias said vacuum tube to cut off in the absence of pulses from said second trigger circuit, a diode having its cathode connected to the cathode of said multi-grid tube and its anode connected to ground, another potentiometer supplying negative bias voltage to the cathode of said diode to thereby cause said diode to be conductive in the absence of a pulse from said multi-grid tube, said diode becoming non-conductive upon receipt of a pulse of positive polarity from said multi-grid tube, and a connection to the anode of said diode for deriving therefrom a pulse when the current passing condition of said diode changes.

5. Apparatus as defined in claim 2 including means for biasing said cathode follower to the anode current cut-off condition in the absence of a positive pulse from the second trigger circuit.

WARREN H. BLISS.

REFERENCES CITED

The following references are of record in the file of this patent:

UNITED STATES PATENTS

| Number | Name | Date |
|---|---|---|
| 2,226,706 | Cawein | Dec. 31, 1940 |
| 2,239,901 | Percival | Apr. 29, 1941 |
| 2,294,117 | Hollingsworth | Aug. 25, 1942 |
| 2,361,437 | Trevor | Oct. 31, 1944 |
| 2,363,810 | Shrader | Nov. 28, 1944 |
| 2,408,821 | Stearns | Oct. 8, 1946 |
| 2,425,315 | Atwood et al. | Aug. 12, 1947 |
| 2,432,180 | Tourshou | Dec. 9, 1947 |
| 2,449,985 | Gloess | Sept. 28, 1948 |
| 2,459,798 | Detman | Jan. 25, 1949 |